Feb. 5, 1963
R. HIRSCHSON
3,076,537
AUTOMATIC VENDING MACHINES
Filed Oct. 2, 1959
6 Sheets-Sheet 1
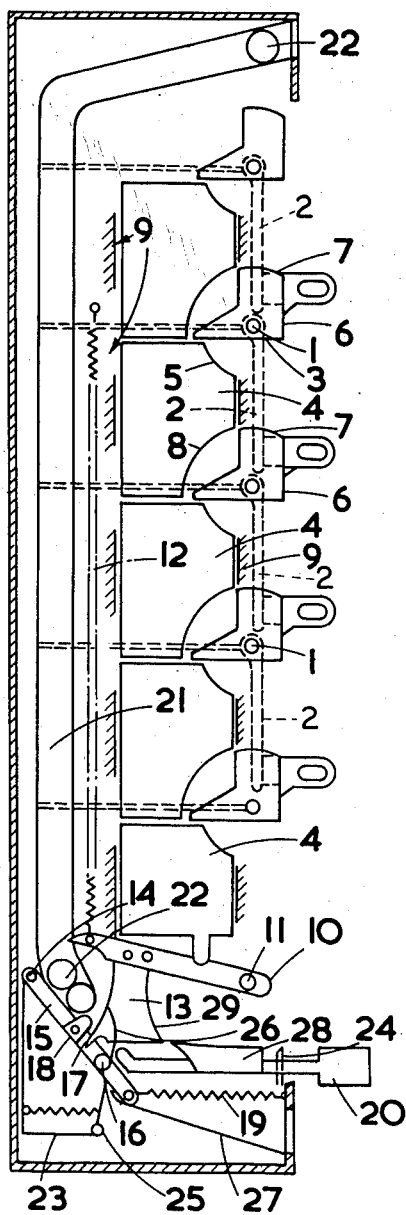
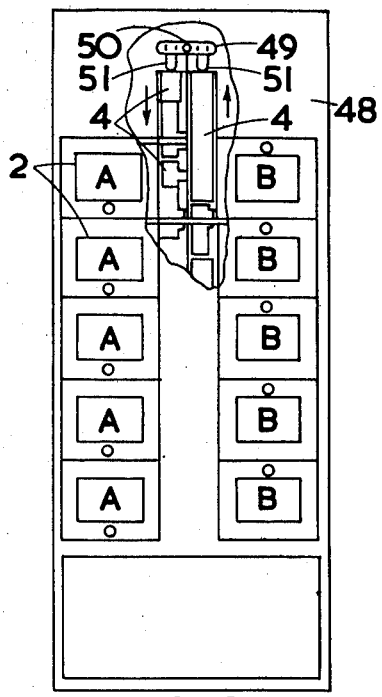
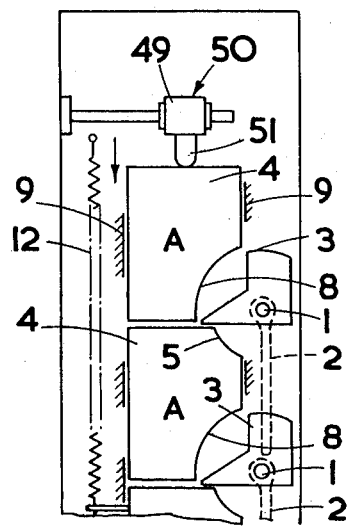
INVENTOR
RICHARD HIRSCHSON
BY Mawhinney & Mawhinney
ATTYS

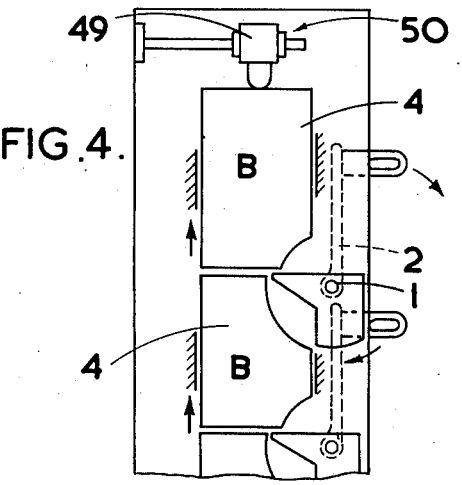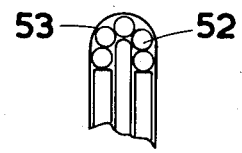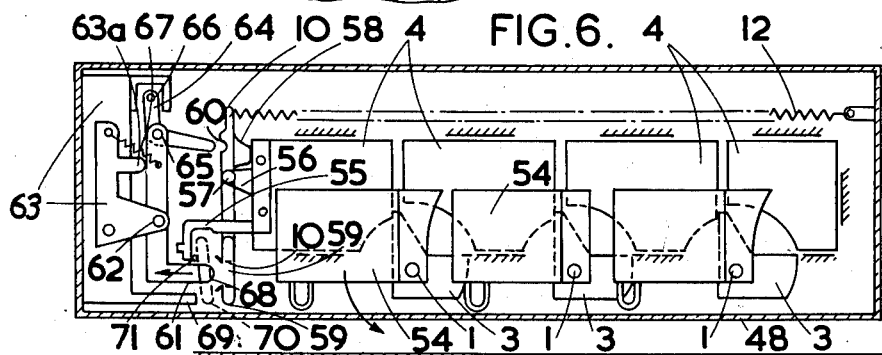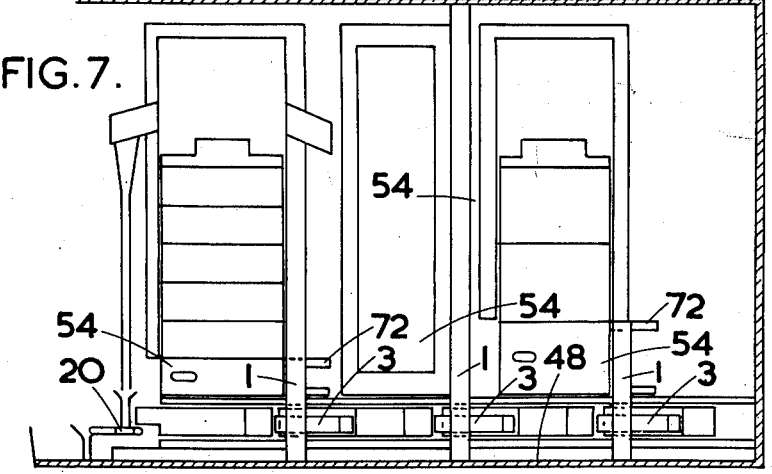

Feb. 5, 1963 R. HIRSCHSON 3,076,537
AUTOMATIC VENDING MACHINES
Filed Oct. 2, 1959 6 Sheets-Sheet 3
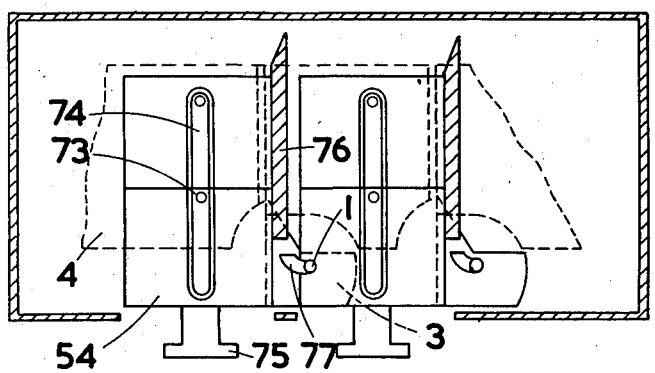
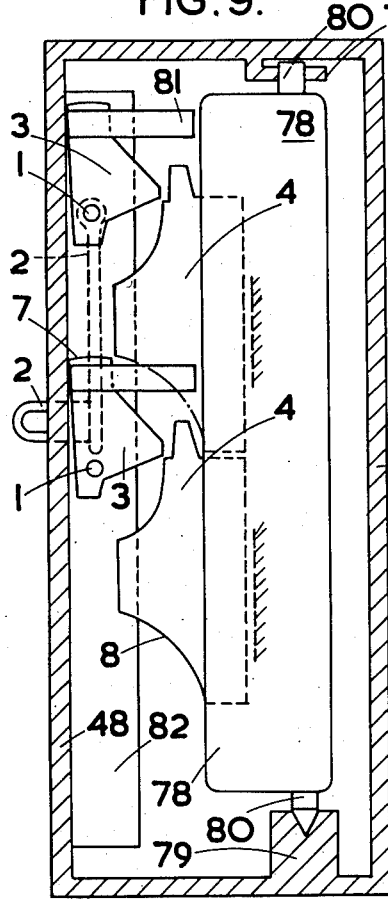
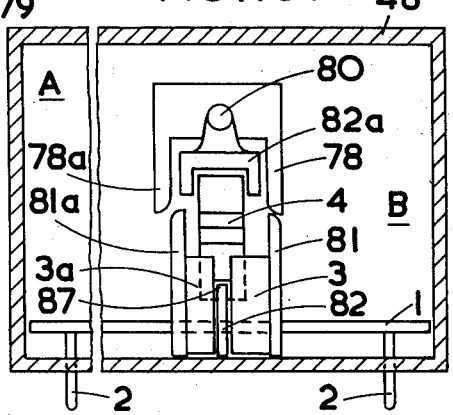
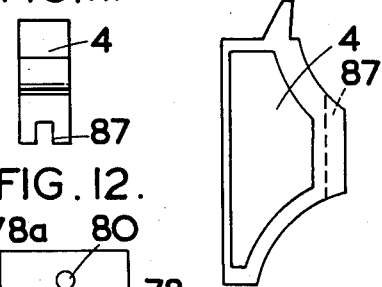
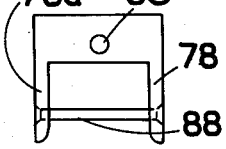
INVENTOR
RICHARD HIRSCHSON
BY Mawhinney & Mawhinney
ATTYS Feb. 5, 1963  R. HIRSCHON  3,076,537
AUTOMATIC VENDING MACHINES
Filed Oct. 2, 1959  6 Sheets-Sheet 4
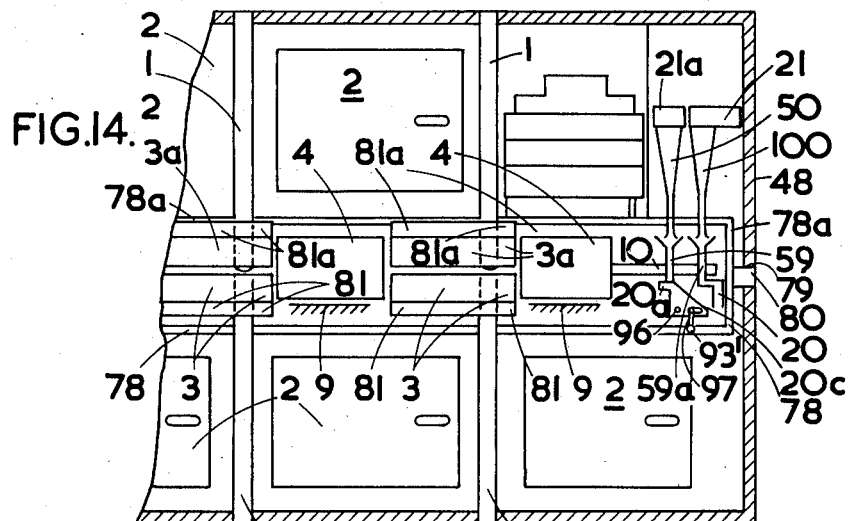
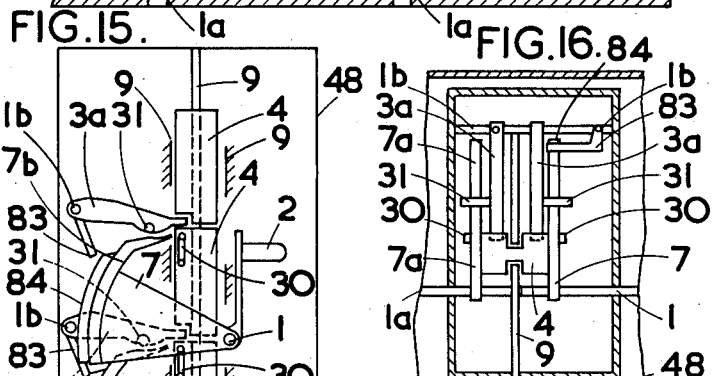
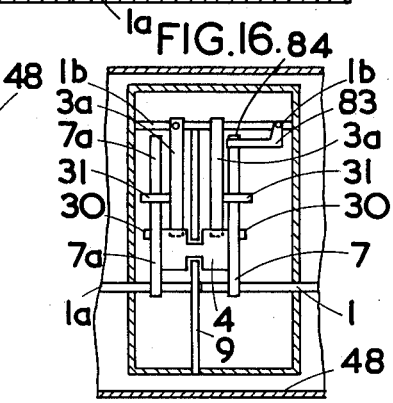
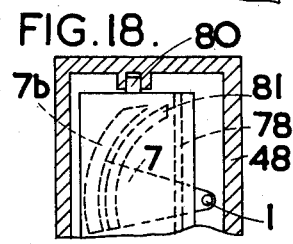
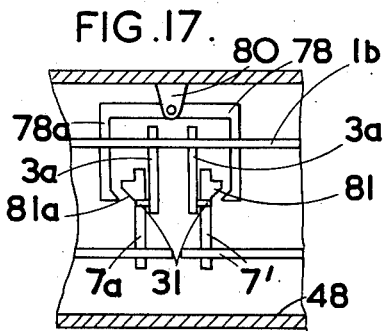
INVENTOR
RICHARD HIRSCHON
BY Mawhinney & Mawhinney
ATTYS Feb. 5, 1963  R. HIRSCHSON  3,076,537
AUTOMATIC VENDING MACHINES
Filed Oct. 2, 1959  6 Sheets-Sheet 5
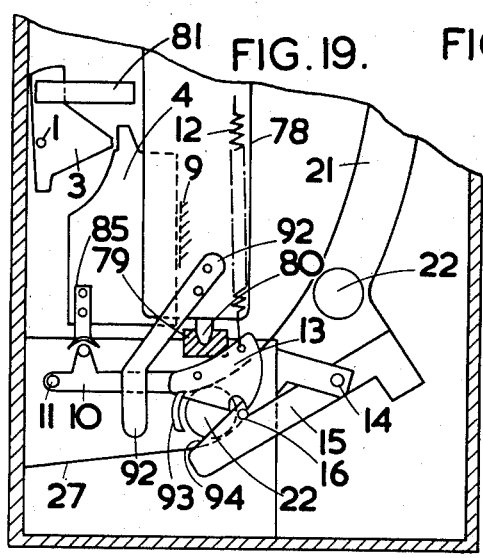
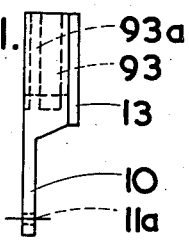
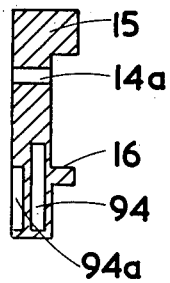
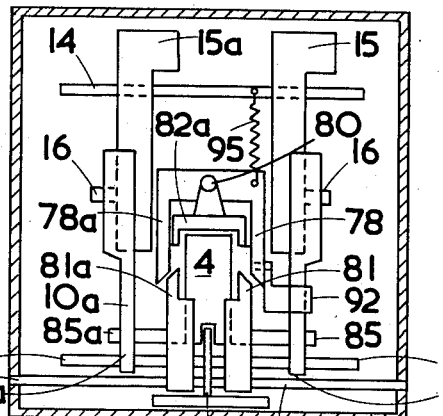
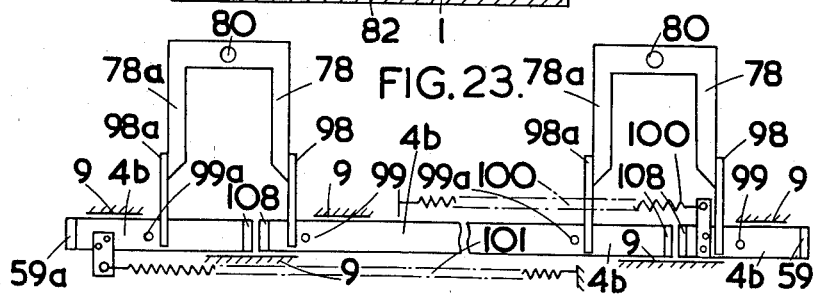
INVENTOR
RICHARD HIRSCHSON
BY McKinney & McKinney
ATTYS Feb. 5, 1963 R. HIRSCHON 3,076,537
AUTOMATIC VENDING MACHINES
Filed Oct. 2, 1959
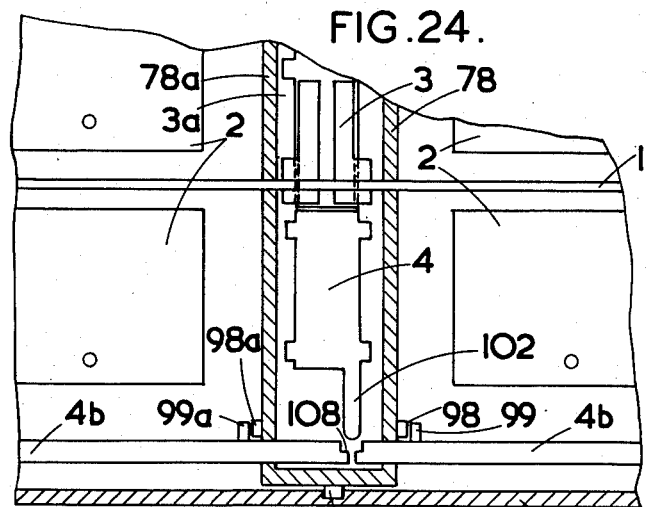
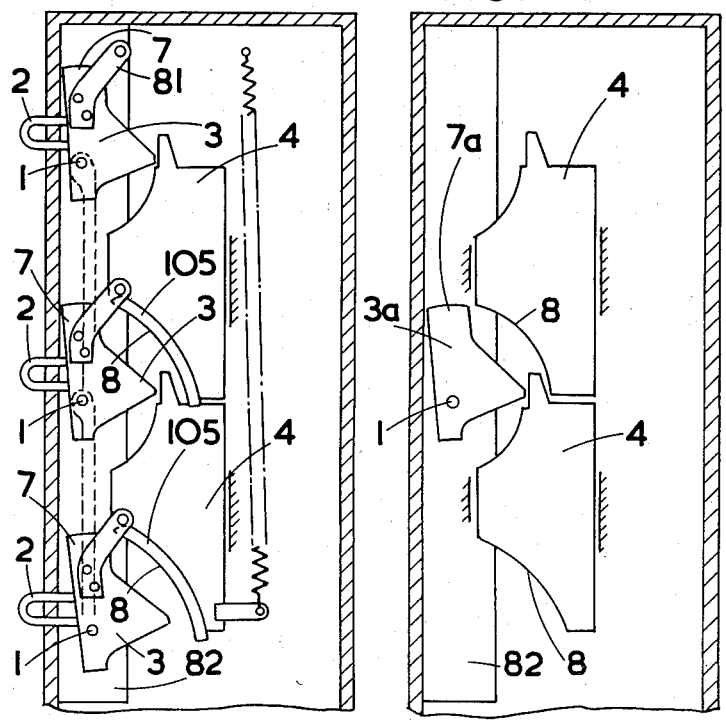
INVENTOR
RICHARD HIRSCHON
BY Mawhinney & Mawhinney
ATTYS.

United States Patent Office 3,076,537
Patented Feb. 5, 1963

3,076,537
AUTOMATIC VENDING MACHINES
Richard Hirschson, Eberstrasse 18,
Berlin-Schoneberg, Germany
Filed Oct. 2, 1959, Ser. No. 844,039
Claims priority, application Germany Oct. 8, 1958
17 Claims. (Cl. 194—65)

This invention relates to automatic vending machines with one or more series of goods compartments arranged in columns or rows next to one another.

In such machines each compartment must be locked by a locking device and, after a coin has been inserted, only a selected compartment must be openable. The present invention is concerned more particularly with the locking mechanism and the associated coin release mechanism for such machines.

According to this invention, in an automatic vending machine having a series of goods compartments arranged in a row or column, each compartment having a closure member for preventing access to the compartment and in which any desired closure member can be operated to open a compartment after insertion of a coin, there are provided a series of blocking elements displaceable to push one against another and a series of control elements associated with and actuated by operation of said closure members, the control elements engaging shaped faces on the blocking elements, each control element, except possibly one end element of the series, engaging two adjacent blocking elements to displace one of these blocking elements and to prevent displacement of the other hence displacing any further blocking elements beyond said one and preventing displacement of any remaining blocking elements, the control elements and shaped faces on the blocking elements being so arranged that the movement of one control element positions the blocking elements to prevent movement of any other control element.

With the above described arrangement each blocking element can be made with operating faces formed integrally with the element as a single casting, thereby giving a relatively simple and cheap economic method of manufacture, which ensures that the various faces are accurately positioned, compared with previous types of mechanism in which separate tapering cast segment curves are screwed or otherwise secured to each closure member and have to be accurately positioned in assembly. Furthermore there is no possibility of play developing such as happens in the prior types of construction in which the tapering segment curve can work loose on the closure member. The actuation of the blocking elements by a control member in the form of a lever gives a bigger movement of the elements for a given movement of the closure member than has been possible with prior types of segment plates.

Each of the control elements may be rotated on operation of the associated closure member and have an arcuate working surface forming a circular arc about the axis of rotation, which working surface engages under a suitably shaped guiding surface on the end member of the undisplaced part of the series of blocking elements to prevent displacement of that blocking element, the arcuate working surface on the control element being terminated at an edge parallel to a lateral edge of the blocking element and arranged so that rotational movement of the control element is blocked if the blocking element is displaced.

In a vending machine having two adjacent rows or columns of goods compartments, corresponding rows or columns of blocking elements may be arranged next to each other between the rows or columns of goods compartments, the closure members of the goods compartments and the blocking elements of the two rows of columns being arranged to move in opposite directions and the two sets of blocking elements being coupled to one another so that they are effective on operation of any one closure member to prevent operation of any other closure member.

Preferably, however, in a machine having two adjacent rows or columns of goods compartments, only one series of blocking elements is provided for the two rows or columns of goods compartments, each goods compartment having a closure member and control element and the blocking elements being arranged so that each can be actuated by the appropriate control elements of the series of compartments so that, on opening one closure member of one series of compartments, all the compartments of both series are locked with the exception of the adjacent compartment and wherein locking means operated by the opened closure member are provided for locking this adjacent compartment.

It will be seen that in either of these constructions using two rows or columns of goods compartments, it is possible to employ a single coin release device which is common to all the goods compartments.

In the following description reference will be made to the accompanying drawings in which:

FIGURE 1 is a side elevation view of a control mechanism for an automatic vending machine;

FIGURE 2 is a front elevation of a vending machine with two columns of sales compartments and employing a single coin release mechanism common to all the sales compartments;

FIGURE 3 is a side elevation view of part of the locking mechanism for one column of compartments in the machine of FIGURE 2;

FIGURE 4 is a view similar to FIGURE 3 of the locking mechanism for the other set of compartments of the machine of FIGURE 2;

FIGURE 5 is a diagram illustrating a modification of part of the mechanism of FIGURE 2;

FIGURE 6 is a plan view of part of the mechanism for an automatic vending machine having a number of goods compartments arranged in a horizontal row and pivoted for swinging out horizontally and having a coin release mechanism in a horizontal position;

FIGURE 7 is a front view of the vending machine of FIGURE 6;

FIGURE 8 illustrates a modification of the arrangement of FIGURES 6 and 7 in which goods compartments can be pulled out linearly;

FIGURE 9 is a side elevation of part of the mechanism of a vending machine having two columns of sales compartments;

FIGURE 10 is a plan view of part of the mechanism of FIGURE 9, the top cover of the machine being removed;

FIGURE 11 is a plan view of a blocking element employed in the machine of FIGURE 9;

FIGURE 12 is a plan view of a channel member used in the mechanism of FIGURES 9 and 10;

FIGURE 13 is a side elevation view of a blocking element employed in a modification of the arrangement of FIGURES 9 and 10;

FIGURE 14 is a front view, with part of the cover removed, of a vending machine with two rows of goods compartments arranged horizontally and having two coin releasing devices for coins of different value;

FIGURE 15 illustrates another construction of compartment mechanism for a vending machine having two columns of goods compartments;

FIGURE 16 is a plan view of the mechanism of FIGURE 15;

FIGURE 17 is a plan view of a modified form of the mechanism of FIGURES 15 and 16;

FIGURE 18 is a side view of part of the mechanism of FIGURE 17;

FIGURE 19 is a side view illustrating part of actuating mechanism and coin release devices for a machine employing two coin release devices for coins of different values;

FIGURE 20 is a plan view of part of the mechanism of the machine of FIGURE 19;

FIGURES 21 and 22 illustrate a modified form of component for the mechanism of FIGURES 19 and 20;

FIGURE 23 is a plan view of part of actuating device of a vending machine with two coin release devices for coins of different values in a machine having more than two columns of compartments;

FIGURE 24 is a front view partly in section through the housing and actuating device of the machine of FIGURE 23;

FIGURE 25 is a side view of another form of actuating mechanism which is in some respects simpler than the construction of FIGURES 9 to 15; and FIGURE 26 is a rear view of part of the mechanism of FIGURE 25 showing one of the operating levers for the locking elements.

FIGURE 1 of the drawings illustrates part of an automatic vending machine having a series of goods compartments arranged one above the other with doors 2 carried on horizontal pivot pins 1. Levers 3 are secured on the pins 1 to turn therewith so that they are tilted in an anti-clockwise direction when the doors 2 are opened. When tilting of a lever 3 takes place, the end of the lever acts on the upper edge of one blocking element 4 of a series of such elements, pushing this downwards, together with the blocking elements located below it.

A guide curve 5, formed concentrically with the pivot axis 1, is formed at the end of an upper horizontal edge of the blocking element 4, allowing the lever 3 to tilt further without causing a further downward movement on the part of the blocking element 4. The lever 3 is connected to or formed integrally with a cam 6, the upper surface 7 of which extends concentrically with the pivot axis 1. When the lever 3 tilts in an anti-clockwise direction, the surface 7 moves under the guide surface 8 (likewise formed concentrically to the axis 1) of the blocking element 4 located above it, obstructing this and so the blocking elements 4 located above it from downward movement.

Vertically extending guiding edges of the downwardly pushed blocking elements 4 have been pushed in front of the cams 6 and their vertically extending surfaces on the levers of doors below that which has been opened so that tilting of the levers 3 is not now possible. In the case of the upper, undisplaced blocking elements 4, tilting of the levers 3 is not possible because the various levers 3 rest on the upper surfaces of the blocking elements 4 to prevent such tilting.

The row of blocking elements 4 is located between guiding surfaces 9. The bottom element rests on a lever 10 which can be swung about an axis 11 and is urged in a clockwise direction by a tension spring 12. The lever 10 carries an arm 13 which extends towards a lever 15 pivoted at 14. This lever 15 has a pin 16 which is held, under the influence of the spring 19, against a returned coin key 20. The end 17 of the arm 13 strikes the pin 16 if, as the result of the absence of a coin the lever 10 is tilted by the blocking elements 4 without a simultaneous movement of the lever 15.

If, on the other hand, coins 22 are in a coin channel shown at 21 and are resting on a cam 18 of the lever 15, the left end of the lever 10 presses against the coin 22, thereby tilting the lever 15 in a clockwise direction, whereby the pin 16 is moved out of the way of the arm 13, so that the latter can move unhindered. When the lever 15 is tilted sufficiently, the coins can fall past the cam 18 into a money box 23.

A money return key 20, with a stop pin 24 which strikes against the case wall to limit return movement, is arranged, on depression, to displace the pin 16 horizontally. When the money return key is displaced to the left, its end acts on the pin 16, thereby tilting the lever 15 and, at the same time, tilting against spring pressure a side wall 26 of the money box 23 which wall is pivoted at 25 and shuts off the front side of the money box. Thereby the side wall 26 moves behind the falling coins 22 in the coin channel 21 before they can fall down into the money box 23 and leads them out of the case by way of a money return chute 27.

On the money return key 20 is carried a feeler 28 which can slide past on the under surface of the arm 13 as long as the lever 10 has not yet been tilted. As soon as the lever 10 is tilted, however, a blocking surface 29 of the arm 13 is moved in front of the feeler 28. Conversely, the feeler 28 moves under the arm 13 when the return key 20 is operated. Thus only one of the two devices can be moved at a time.

FIGURES 2, 3 and 4 illustrate part of an automatic vending machine having two columns A and B of goods compartments side by side but in which only one coin release mechanism is employed. FIGURE 2 shows the two columns A and B in a housing 48. The doors 2 of the column A are arranged so that they can be swung about their axes 1 in an anti-clockwise direction as shown in FIGURE 3 whilst the doors 2 of the column B are arranged so that they can be moved in a clockwise direction as shown in FIGURE 4. The blocking elements 4 of the two rows are displaced in opposite directions by the respective control elements, which are illustrated as levers 3 similar to those of FIGURE 1, the elements 4 of column A being displaced downwardly, as shown in FIGURE 3 whilst the elements 4 of column B are displaced upwardly as shown in FIGURE 4.

In the housing 48, directly over the end elements 4 of the two rows of blocking elements, there is arranged a reversing device, shown in FIGURE 2 and consisting of a double armed lever 49 which can be swung about the pivot pin 50, which is secured to the housing. On each arm of the double armed lever 49 is a pin with a rounded end 51 which, by virtue of the spring 12 (FIGURE 3) is resiliently held against the top blocking element 4 of both sets of elements. If one of the doors 2 of the sales column B is operated in a clockwise direction, the associated blocking elements 4 are displaced upwards by means of the lever 3 and the double armed lever 49 is swung in an anti-clockwise direction by means of the right-hand pin 51 of FIGURE 2. The double armed lever 49 thereby displaces the blocking elements of row A downwards by means of the other pin 51 and operates the coin release device.

Balls 52 in a curved transmission channel 53 arranged over the two sets of blocking elements, as shown in FIGURE 5, can also be used for the reversing process, instead of a pivoted lever as shown in FIGURES 2 to 4. Here the unblocking of the coin release is achieved by transmitting the pressure on to the ball 52 through the last element 4 of one column on to the last element of the other column.

FIGURES 6, 7 and 8 illustrate parts of automatic vending machines, such as may be used for small packets, e.g. packets of cigarettes, or for bottles or for flowers in which a goods compartment forming a carrier for a packet is moved outwardly.

Referring to FIGURES 6 and 7, goods compartments 54 in a horizontal row are arranged so that they can be swung in an anti-clockwise direction about their vertical pivot pins 1. The pins 1 are located on the front side of a housing 48 next to the goods compartments 54. On the pivot pins 1, levers 3 forming control elements are carried, these being located beneath the goods compartments 54, in a horizontal position. The last element of the row of blocking elements 4 (likewise arranged horizontally) carries a Z-shaped arm 55 to which is fixed a bracket 56 on which is pivoted, by a pin 57, a double armed coin release lever 10. The lever 10 can be swung in an anti-clockwise direction, against the action of a spring 12 which pulls a projection 58 on one arm of the lever 10 into contact with the last element of the row of blocking elements 4. The coin release lever 10 has, on its longer arm (pointing to the front side of the case), a coin slot 59, which is accessible from above and has a recess 60 on the shorter end. The coin release lever 10 co-operates with a double armed lever 61 located opposite it, which can be swung in a clockwise direction about a pivot pin 62 on a carrier 63 fixed by screws to the housing 48. Under the action of a spring 67, one arm of the lever 61 rests on a stop 63a. The double armed lever 61 carries on its rear, longer end a double armed latch 64, which is pivoted on the lever 61 by means of a pin 65. When the lever 61 is in a position of rest, the longer arm of the latch 64 is directed towards the aforementioned recess 60 of the coin release lever 10. A pin 66 on the shorter leg of the latch 64 engages the carrier 63, which is U-shaped at this point. The double armed lever 61 has extending at right angles from its front end a coin feeler pin 68, which is directed towards the coin slot 59 of the coin release lever 10. The coin slot 59 has in its side wall a hole for engagement by the coin feeler pin. The transit hole is somewhat smaller than the coin, so that the coin in its normal position rests on the side walls in the coin slot and on the base 20 (FIGURE 7) which is joined to a coin return key.

If there is no coin in the coin slot 59 of the double armed coin release lever 10, the feeler pin goes through the hole of the lever 10 and is thus not swung out. When the blocking elements 4 move, the latch 64 strikes the recess 60 of the coin release lever 10 supported by the stop 58 and prevents the blocking elements 4 from being displaced. If a coin is inserted into the coin slot 59, however, when the coin release lever 10 moves in the direction of the double armed lever 61 (which is working in co-operation with it), the inserted coin immediately strikes against the coin feeler pin 68. Since the spring 12 is considerably stronger than the spring 67, the result is that the double armed lever 61 is swung in a clockwise direction and the latch 64 (which is linked to it) is swung in an anti-clockwise direction, as the latter hits with its pin 66 against the front side piece of the fixed, U-shaped carrier 63. Thereby, the latch 64 comes outside the effective range of the coin release lever 10 and the latter can consequently be further displaced towards the lever 61.

When the lever 10 is further displaced, it strikes with its front part against an arm 69 extending at right angles from the carrier 63 which is firmly joined to the case. At this point a coin slot 70 leading to a cash box is provided. When the coin release lever 10 is displaced further, it is swung by the arm 69 against the action of the spring 12, so that the coin (which is still clamped between the coin feeler pin 68 and the coin slot 59) comes into an oblique position in relation to it because the coin slot 59 is also in an oblique position as the lever 10 is tilted by running against the fixed arm 69. The coin is freed from its clamped position by the approach of the Z-shaped arm 55 and by the pressing back of the feeler pin 68 which is caused by it. As soon as the coin has safely fallen into the cash box, the displacement of the last end element 4 is expediently ended with the aid of the concentrically extending part of the blocking element 4 (described earlier). For purposes of returning the coin release device to its original position, when the blocking element moves backwards, the forwardly directed arm of the Z-shaped arm 55 strikes with its backward edge against a catch 71 on the coin feeler pin 68, thereby forcing, with the help of the spring 67, the double armed lever 61, together with the latch 64 linked to it, to return to its normal position. Thus the latch 64 has returned to a blocking position in relation to the coin release lever 10 and its recess.

In the construction according to FIGURES 6 and 7, with compartments 54 which can be swung outwardly, the compartments 54 are formed as U-shaped boxes with removal openings at least on the left frontal side. The side of the goods compartment 54 nearer the pivot 1 is provided with a supporting surface 72, bent at right angles, which adjoins the upper edge of the goods compartment and serves, during swinging movement, to support a stack of goods situated above it.

In the construction shown in FIGURE 8, the goods compartments are formed as drawers which can be pulled out. In this case, the goods compartments 54 are guided by pins 73 engaging with guide slots 74 and are pulled out of the housing 48 by handles 75. When this movement takes place, a lateral ledge 76 installed on a goods compartment strikes against a catch cam 77, arranged on the pivot 1 (which is under spring pressure) level with the goods compartment, and turns the catch cam 77 and the lever 3 forming the control element (which is likewise fixed to the pivot 1) in an anti-clockwise direction. During this process, the catch cam 77 continues to lie near the lateral ledge 76 until the goods compartment 54 is pushed back into its original position.

FIGURES 9 to 13 illustrate part of an automatic vending machine having two columns of goods compartments, each with a pivoted door as in FIGURE 1 but having only a single column of blocking elements 4 for both columns of goods compartments.

Referring to FIGURES 9, 10 and 11 on tilting one of the doors 2 about its pivot 1, the blocking elements 4 are moved in the general coin releasing direction by means of the levers 3. Thereby all the doors 2 of both columns of compartments A and B (see FIGURE 10) are locked with the exception of the adjacent door 2. An actuating fork in the form of a channel member 78—78a serves to lock this door 2, which fork comprises actuating limbs 78 and 78a forming the side arms of the channel. Acting upon the actuating limbs 78 and 78a are control arms 81 and 81a, which are linked to the levers 3. The blocking elements 4 are guided on a rib 82 (see FIGURE 9) by means of a slot 87 (see FIGURE 12) in the centre of their front edges. Acting upon the elements 4 are the levers 3 and 3a, on the left and right side of the rib 82. The opposite, i.e. the rear, edge of the elements 4 are guided in a continuous channel 82a, which is rigidly connected to the guide member formed by the rib 82 mounted in the housing 48.

In the top and the bottom of the housing 48, the limbs 78 and 78a of the actuating fork are rotatably mounted in bearings 79 by means of pins 80. On the upper bearing surface 7 (FIGURE 9) of each lever 3 the control arm 81 is so welded that it can tilt to one side of the blocking element 4 and its wedge-shaped ends can engage the similarly wedge-shaped ends of the actuating limb 78 as seen in FIGURE 10. Thereby on operation of a lever 3, the actuating limb 78 is tilted and moves the second limb 78a on the opposite side into the reach of the control arm 81a of the adjacent row of levers 3a, so that movement of the adjacent lever arm 81a is made impossible. Thus only one door 2 at a time of the two adjacent rows of compartments A, B can be operated.

In order to prevent the comparatively thin-walled limbs of the actuating fork 78, 78a bending apart on forceful operation of the locked doors 2 or on the simultaneous operation of two adjacent doors, it is expedient to link the fork arms 78, 78a by several cross-bars 88 as shown in FIGURE 12. In order to allow the cross-bars 88 to pass through the row of the blocking elements 4, the blocking elements 4 are frame-shaped as shown in FIGURE 13 whereby a large reduction of weight is achieved.

Instead of pivotally mounting the channel member forming the fork 78, 78a, this member might be rigidly mounted and the control arms 81, 81a might be pivotally mounted on the levers 3, 3a and connected by crossmembers to move together. The operation would be similar to the arrangement of FIGURES 9–13 to prevent the opening of adjacent doors; one or other of arms 81, 81a being blocked by the corresponding fork arm 78, 78a. In further alternative arrangements the fork arms 78, 78a or the control arms 81, 81a might be made linearly movable parallel to the pivot axes 1 instead of being pivotally mounted for movement in this direction.

FIGURE 14 illustrates an automatic vending machine having two horizontal rows of goods compartments with closure members formed by doors 2 pivoted about vertical axes 1, 1a. A member 78, 78a corresponding to the member 78, 78a of FIGURES 9–13 is, in this case arranged horizontally and is actuated by control arms 81, 81a on levers 3, 3a. If the row of blocking elements 4 as in the above example according to FIGURES 9 to 13 is horizontally shifted between the rows of compartments which are mounted above each other instead of beside each other, then the actuating device 78, 78a can act in the above described manner. As shown in FIGURE 14 on the right hand side the actuating device 78, 78a with the pin 80 is mounted in the housing wall 48 (the opposite bearing is not shown). If a door 2 is operated then the levers 3 or 3a above the axes 1 or 1a and the control arms 81 or 81a connected with them are tilted away. The actuating limb 78a which in its normal position abuts against the control arm 81a is, when the upper control arm 81a is tilted in the direction of the actuating limb 78a, rotated about its pins 80. Thereby the bottom control lever 81 is brought into its locking position as described with reference to FIGURES 9 and 10.

FIGURES 15 and 16 illustrate an automatic vending machine in which segment-shaped locking members 7 are employed. In FIGURES 15 and 16, a machine with two columns of goods compartments is illustrated. Here the control and bolting bodies 3 and 7 are located separately from one another, and the bolting body 7, formed as a segment plate, swings with its inner edge along a blocking surface 30 of a blocking element 4, thus locking the part of the column of blocking elements located beneath it. The segment plate 7 is formed at 7a as a rising curve which, when the plate 7 is tilted as a result of a goods compartment having been opened, acts on a projection 31 of a control lever 3a so that this is swung about its pivot in an anticlockwise direction. As the end of the control lever 3a engages from behind under the last of the blocking elements 4 located above it, it moves upwards. The coin blocking device (not shown) can be released by the uppermost member of this row of blocking elements.

If a closure member 2 of the two column system illustrated is operated, then with the help of a segment limb 7a and its corresponding lever 3a, which is rigidly connected to the spindle 1b, one of the blocking elements 4, of the column of blocking elements 4 which is common to both rows of compartments, is shifted by the engagement of a segment limb 7b with a lug 31 on the lever 3a. As is shown in FIGURE 16, the row of blocking elements 4 lies between the segments 7 and 7a, which are provided on separate pivots 1, 1a. Whilst the one lever 3a is rigidly connected to the spindle 1b, the second lever 3a, which co-operates with the segment 7 by means of the lug 31, is loosely mounted on the spindle 1b. A checking arm 83 is further provided on the spindle 1b near the loosely mounted lever 3a. By turning the spindle 1a by means of its closure member 2 (not shown) the segment 7a is tilted and thereby the lever 3a, rigidly connected with the spindle 1b, is likewise tilted. Since the checking arm 83 which is downwardly directed, is thus similarly tilted, it swings in front of the front end of a narrow checking segment limb 84 which is fixed only to the segment 7 and thus prevents the segment 7 from tilting away.

On the other hand, if the segment 7, with the lever 3 loosely mounted thereon, is tilted, then twisting of the spindle 1b does not occur. The downwardly directed checking arm 83 engages the narrow checking segment limb 84, slides beside it and thereby checks the spindle 1b against turning. Operation of the segment 7a is consequently not possible.

Likewise FIGURES 17 and 18 show an embodiment of the actuating device in use with segment-shaped locking members 7 similar to those of FIGURES 15 and 16, but use is made of a member 78, 78a similar to that employed in FIGURES 9 and 10.

Since the closure members 2 are tilted in the opposite direction to that in the embodiment of FIGURES 9 and 10, the segments 7, 7a connected with the pivot 1 are tilted out of the interior of the housing 48 on operation in the direction of the housing front. For this reason the wedge-shaped rising members, which are provided at the ends of the actuating limbs 78, 78a, are directed inwardly. The control arms 81 (FIGURE 18) and 81a are segmental and are secured on the segments 7, 7a. They have similar wedge-shaped ends. On turning the closure member about the pivot 1, the wedge surface of the segmental control arm 81 engages (see FIGURE 17) with the wedge surface of the actuating member 78 and thereby tilts the opposite limb 78a into the blocking position so that the segmental control arm 81a cannot move.

FIGURES 19, 20 and 21 illustrate an improvement of the coin releasing device described with reference to FIGURE 1. In the arrangement of FIGURES 19 and 20, a second coin releasing device consisting of the same components with different coin values, can be operated, for two adjacent rows of compartments having different coin values, by the same control members.

According to FIGURES 19 and 20 the coin releasing device for one column comprises a coin feeler 10 under spring tension and a coin receiver 15 which are mounted on spindles 11 and 14. A similar device is provided on the same spindles, as is shown in FIGURE 20 for the neighbouring column on the opposite side of the columns of blocking elements 4. Two coin receivers 15 and 15a are mounted on the spindle 14 situated near the back wall of the housing. Coin feelers 10 and 10a are mounted on the other spindle 11. The last element 4 of the row of blocking elements carries on each side a lug 85, 85a which acts on each of the coin feelers 10, 10a. If one of the closure members 2 is opened after insertion of a coin in one of the neighbouring coin releasing devices, both coin feelers 10, 10a are tilted together by means of the lugs 85, 85a of the last element 4, in the manner described with reference to FIGURE 1, and thereby both the coin receivers 15 and 15a are also tilted by the insertion of the coin 22. In spite of the coin releasing devices thus being freed for both rows of compartments, only one closure member of one row of compartments can ever be operated, since the neighbouring closure members 2 of the second row of compartments are checked by means of the actuating devices 78, 78a, 81, 81a, 3 and 4. This arrangement of the coin control members, however, does not prevent the operation of the row of compartments of higher coin value, by inserting a coin into the coin releasing device of lower coin value. This drawback is prevented in a simple way by a device controlled by the actuating devices so that the coin of lower value is led into the coin returner on the operation of a closure member of the row of compartments with higher money value, before it can act upon the coin releasing device. As shown in FIGURES 19 and 20 the actuating limb 78 is connected, for this purpose, to an arm 92, a fork of which extends above the coin feeler 10. The fork length of the arm 92 reaches at least to the turning path which the coin feeler 10 sweeps out on operation of the row of blocking elements. Thus the coin feeler 10 is permanently arranged opposite the fork 92. The actuating device 78, 78a is arranged in the neutral position so that the actuating limb 78a abuts the control arm 81a by means of the spring 95 (see FIGURE 20). Thus, if, on insertion of a coin 22, a closure member 2 of the row of compartments of higher coin value is operated, the control arm 81a engages the actuating limb 78a co-operating with it and thereby tilts the actuating limb 78 into the check position opposite the control arm 81. By its tilting the actuating limb 78 has moved the coin feeler 10 sideways a little by means of the fork arm 92 connected with it, the bore 11a (FIGURE 21) of which feeler is made for this purpose somewhat larger than the spindle carrying it. Since the coin feeler 10 is provided with a catch-surface 93 (FIGURE 19), which with the tilting of the coin feeler 10 moves out of the coin runway of the coin receiver 15, the coin rolls into the coin return chute 27 owing to the displacement of the forked arm 92, as long as there is a slight play between the lugs 85, 85a and the engaging position of the coin feelers 10, 10a. The displacement of the forked arm 92 allows the return of the coin in this manner, before it can act upon the coin releasing device. The operation of a closure member of a row of compartments of higher value after the insertion of a coin of lower worth in the coin releasing device intended for the lower coin value is rendered impossible by means of this simple device 92.

It is possible to combine both the coin releasing devices of FIGURE 20 in one unit by fitting the coin receiver 15 with two adjacent coin guides 94, 94a for the different coin values as shown in FIGURE 22. On one side it carries the latch-pin 16, which locks in the groove of the lug 13 on operation of the coin feeler 10 on the non-insertion of a coin (see FIGURE 19). It has the bore 14a and is mounted on the spindle 14 as shown in FIGURE 20. The coin feeler 10 co-operating with it is similarly provided with two adjacent coin catching and working surfaces 93 and 93a, which co-operate with the coin guides 94 and 94a. The coins of different value are guided, after examination, by means of two adjacent coin passages 21 (see FIGURE 19) to the coin guides 94, 94a of the coin receiver 15. The coin feeler 10 has the bore 11a and is mounted on the spindle 11 (see FIGURES 19 and 20). The check surfaces 13 are provided on its outside. By such a simplified arrangement the coin releasing device for a different coin value requires only one lug 85 on the last blocking element 4 for the operation of the coin releasing device, just as only one check surface 13 and one check pin 16 is necessary.

Referring again to FIGURE 14 in which the compartments are arranged horizontally, and in which the blocking elements 4 and the actuating devices 78, 78a co-operating with them are similarly arranged horizontally between the compartments in the machine housing 48, the coin releasing devices of FIGURE 6 can be used, through the assembly of a coin releasing device for different values, and using simplified means as are used in the last described FIGURES 19, 20 and 21. Referring to FIGURE 14, here also the coins of different value are led to the coin receiver 10 connected to the last blocking element 4 from two adjacent coin guide passages 21, 21a formed in the housing 48, which coin receiver is provided with the coin slots 59, 59a for this purpose. On certain surfaces 20, 20a the coins are brought to their respective slots 59, 59a in position to remove the coin check. Of the two surfaces 20, 20a, the surface 20a, which is for supporting the coin of lower value, is swingably mounted on the pivot 96. The swingable surface is exactly as in the last described embodiment according to FIGURES 19, 20 and 21 with the actuating limb 78 connected to a control arm 97 (FIGURE 14). The control arm grips a lug very near the pivot 96 in a slot in the surface 20a as soon as the horizontal actuating device 78, 78a with its stud 80 is tilted in its bearing 79 (the opposite bearing is not shown, see FIGURE 9). The neutral position of the actuating device 78, 78a by itself is opposite to that of the described embodiment according to FIGURE 20, since through the horizontally tilted position of the actuating device 78, 78a this moves automatically by means of its weight into position with the wedge-shaped ends of the actuating limb 78a against the similarly wedge-shaped control arm 81a, which is connected to each horizontal lever 3 of each of the vertical pivots 1. Since the actuating device 78, 78a, exactly as in the described embodiment according to FIGURE 20, on operation of a closure member 2 of the upper horizontal row of compartments of higher coin value, tilts, the actuating limb 78a by means of one of the control arms 81a, which are fixed to the levers 3a of the upper vertical pivots 1, on the rising of the wedge surface of one control arm 81a against the wedge surface of the actuating limb 78a, the coin carrying surface 20a, which is connected to the control arm 97, fixed to the second actuating limb 78, is also tilted about its pivot 96 in the direction of the blocking elements 4 and the coin is guided in the manner described into the money return member (not shown), before it acts upon the coin feeler of the coin releasing device fully described in FIGURES 6 and 7. The oblique surface 20c on the lever 20a ensures that the coin slides well into the money return member and is not caught fast on the pivot stud of the surface 20a.

If several adjacent rows of compartments for different coin values are located in an automatic vending machine, then, with the help of the actuating devices which always belong to two adjacent rows of compartments, it is possible in a simple manner as shown in FIGURES 23 and 24 to manage with two coin releasing devices by arranging any desired number of adjacent rows of compartments, as long as the row of blocking elements 4 of two adjacent rows of compartments (see FIGURE 24) co-operates with a second series of blocking elements 4b, which is influenced by the actuating limbs 78, 78a of each individual row of compartments, so that the actuating device, with the help of the control arms 98, 98a which are provided on both sides of its actuating limbs 78, 78a, ensures the shifting of one part of the second series of blocking elements 4b, whilst, with the help of one check lug 102 controlled by each first row of blocking elements 4, the blocking of each closure member of the rows of compartments, excepting the chosen closure member 2, is ensured. The corresponding part of the second series of blocking elements 4b shifted by the actuating limbs (FIGURE 23) is then used to release the coin releasing devices of different coin value, which are provided on both sides of each end member 4b of the second series of elements 4b, namely with the help of the coin inserted into the coin slots 59 and 59a of each last element of the series 4b.

As shown in FIGURES 23, 24 the second series of elements 4b, which is horizontally mounted in the lower part of the housing 48 consists of the same abutting members 4b. The horizontal series of elements 4b is under spring tension on both sides by the corresponding springs 100, 101 attached to the last element 4b. The length of each element 4b corresponds to the distance between two adjacent rows of compartments or their actuating devices 78, 78a (see FIGURE 23). The abutting ends of two elements 4b are cut about half way through and form in the upper half a recess 108 for the check lug 102 which is provided on the last element 4 of the operated row of elements 4. If a closure member 2 of one of the rows of compartments is operated, the corresponding actuating device 78, 78a is swung in the manner described and shifts, by means of one of the control arms 98, 98a located on both sides of the actuating limbs 78, 78a, a part of the second series of elements 4b, towards the coin releasing device which co-operates with this part, whereby the corresponding coin releasing device is released on inserting a coin in one of the coin slots 59, 59a.

Owing to the shifting of the first vertical row of elements 4 thus effected in the direction of the recess 108 which is formed by the two abutting ends of two elements 4b of the second horizontal series of elements 4b, the check lug 102 connected to the last element 4 enters the recess 108, moves in front of the edge of the last element 4b of the unshifted part of the series of elements 4b which is interrupted in this place and thus checks the unshifted part of the second series of elements 4b against shifting by any unallowed operation of further closure members 2 of those rows of compartments which are connected to this unshifted part through their actuating devices 78, 78a, since every element 4b with its rigidly connected catch 99, 99a (see FIGURES 23, 24), due to its own check position, checks the actuating forks 78, 78a of these rows of compartments against tilting.

The shifted part of the series of elements 4b checks the vertical rows of elements 4 against operation of further closure members 2 since the check lugs 102 located directly above the elements 4b would engage the upper edge of the check surfaces of the elements 4b due to the shifted position of the horizontal elements 4b on operation of a closure member 2. Dependent upon the respective insertion of a coin to the left or right of the series of elements 4b, the coin releasing devices of different coin values located there are operated, due to the reciprocally acting actuating device.

FIGURES 25 and 26 show a particularly simple embodiment of the actuating device for an automatic vending machine having two columns of goods compartments. According to FIGURE 9 the actuating device comprises a single row of elements 4 for two adjacent rows of compartments and a control arm 81 attached to the lever 3. In contrast to the embodiment according to FIGURE 9, the control arm 81 in FIGURES 25 and 26 is only located on one side of the row of levers 3. This control arm 81 co-operates with a curved lug 105, which is similarly located on one side only of the row of elements 4 (see FIGURE 25).

The support cams 7 of the operating levers 3 (see FIGURE 25) are shortened compared to those of the levers 3a (see FIGURE 26) which swing from the pivot 1a on operation of adjacent closure members (not shown) immediately beneath the guide surface 8 of the element 4 above it, which surface is concentric with the axis 1, so that a slight space occurs between the cam 7 of the lever 3 (see FIGURE 25) and the support curve 8 of the corresponding element in the swung position above it. This space is smaller than it is drawn. If now one of the closure members 2 and thus the lever 3 with its control arm 81 (see FIGURE 25) is tilted, then simultaneously the shifting of that part of the row of elements 4 is shifted from the lever 3 by means of the control arm 81 and its co-operating lug 105 of the element 4 lying above the operated lever 3, in the direction of the coin releasing device (not shown) (see FIGURE 19) which results in an immediate checking of the adjacent lever 3a (see FIGURE 26), since the front guide edge of the element 4 lying above it moves in front of the inner edge of the support cam 7a of the lever 3a at the slightest movement and is thus checked.

This slight movement is possible since there is a small space between the support cam 7 and the concentric support curve 8 (see FIGURE 25) in the described manner in the swung position due to the shortening of the cam 7 of the lever 3.

I claim:

1. In a coin-released automatic vending machine having a series of goods compartments arranged in a row or column, the combination of a series of blocking elements displaceable linearly to push one against another, a closure member for each compartment for preventing access to the compartment, and a control element for each compartment, the control elements each being pivotally mounted to constitute a lever and being operatively coupled to the associated closure member to be tilted on operation of the closure member to open a compartment, each control element having a portion engaging one of two adjacent blocking elements which portion on operating a closure member to open a compartment initially moves substantially in the direction of the line of blocking elements to displace said one blocking element and hence any further elements beyond said one element, and each of said control elements having a portion, on initial movement of the closure member, engaging the other of said two adjacent blocking elements to prevent displacement of said other element and hence to prevent displacement of any further elements beyond said other element, the blocking elements and control elements furthermore having cooperating faces so arranged that on the movement of one control element and the consequent displacement of at least one blocking element, the displaced and undisplaced blocking elements prevent movement of any other control element.

2. In a coin-released automatic vending machine having a series of goods compartments arranged in a row or column, the combination of a series of blocking elements displaceable linearly to push one against another, a closure member for each compartment for preventing access to the compartment, and a control element for each compartment, the control elements each being pivotally mounted to constitute a lever and being operatively coupled to the associated closure member to be tilted on operation of the closure member to open a compartment, each control element having a portion engaging one of two adjacent blocking elements which portion on operating a closure member to open a compartment initially moves substantially in the direction of the line of blocking elements to displace said one blocking element and hence any further elements beyond said one element, and each of said control elements having a portion, on initial movement of the closure member, engaging the other of said two adjacent blocking elements to prevent displacement of said other element and hence to prevent displacement of any further elements beyond said other element, the control elements furthermore each having an arcuate working surface forming a circular arc about the axis of rotation and said blocking elements each having a lateral edge and a guiding surface arranged so that said working surface on a control element, on initial movement of a closure member to move the control element, engages under the guiding surface on the end member of the undisplaced part of the series of blocking elements to prevent displacement of that blocking element, the arcuate working surface on the control element being terminated at an edge parallel to said lateral edge of the blocking element and arranged so that rotational movement is blocked if the blocking element is displaced.

3. The combination as claimed in claim 2 wherein there is provided, for each closure member, a pivot shaft on which are mounted both the closure member and its associated control element.

4. The combination as claimed in claim 2 wherein each blocking element has a guiding surface, approximately concentric with the axis of rotation of the associated control element which is to prevent displacement of that blocking element, the guiding surface adjoining that edge of the blocking element which acts on the next blocking element for displacing part of the series of blocking elements.

5. In a coin-released automatic vending machine having a series of goods compartments arranged in a row or column, the combination of a series of blocking elements displaceable linearly to push one against another, a pivoted closure member for each compartment for preventing access to the compartment, a segment plate for each closure member, the segment plates being rigidly connected to the associated closure members and each having a cam surface and also an inner edge concentric with the rotation axis of the closure member, a control element for each compartment, the control elements each being pivotally mounted to constitute a lever, each control element having a portion engaged by the cam surface on the associated closure member, the cam surface being arranged so that the control element is tilted about its axis on operating the associated closure member, each control element having also a portion engaging one of two adjacent blocking elements which portion on operating a closure member to open a compartment initially moves substantially in the direction of the line of blocking elements to displace said one of the adjacent blocking elements and hence any further elements beyond said one element, each control element being arranged so that the initial movement of said portion engaging one of two adjacent blocking elements is greater than the initial movement of said portion engaged by the cam surface on the associated closure member, said blocking elements furthermore having blocking edges cooperating with said inner edge on said segment plates, said blocking edges being arranged so that on operating a closure member to open a compartment, said inner edge rubs over said blocking edge on the other of said two adjacent blocking elements to hold that blocking element and any blocking elements beyond that blocking element against displacement, the blocking elements and control elements furthermore having cooperating faces so arranged that on movement of one control element and the consequent displacement of at least one blocking element, the displaced and undisplaced blocking elements prevent movement of any other control element.

6. In a coin-released automatic vending machine having a series of goods compartments arranged in a row or column, the combination of a linear guide track, a series of blocking elements guided by said guide track and displaceable along the track to push one against another, a closure member for each compartment for preventing access to the compartment, and a control element for each compartment, the control elements each being pivotally mounted to constitute a lever and being operatively coupled to the associated closure member to be tilted on operation of the closure member to open a compartment, each control element having a portion engaging one of two adjacent blocking elements which portion on operating a closure member to open a compartment initially moves substantially in the direction of the line of blocking elements to displace said one blocking element and hence any further elements beyond said one element, and each of said control elements having a portion, on initial movement of the closure member, engaging the other of said two adjacent blocking elements to prevent displacement of said other element and hence to prevent displacement of any further elements beyond said other element, the blocking elements and control elements furthermore having cooperating faces so arranged that on the movement of one control element and the consequent displacement of at least one blocking element, the displaced and undisplaced blocking elements prevent movement of any other control element.

7. In a coin-released automatic vending machine having a series of goods compartments arranged in a row or column, the combination of a series of blocking elements displaceable linearly to push one against another, a closure member for each compartment for preventing access to the compartment, a control element for each compartment, the control elements each being pivotally mounted to constitute a lever and being operatively coupled to the associated closure member to be tilted on operation of the closure member to open a compartment, a coin slot, a coin block, a coin block release member, and a coin return key, each control element having a portion engaging one of two adjacent blocking elements which portion on operating a closure member to open a compartment initially moves substantially in the direction of the line of blocking elements to displace said one blocking element and hence any further elements beyond said one element, and each of said control elements having a portion, on initial movement of the closure member, engaging the other of said two adjacent blocking elements to prevent displacement of said other element and hence to prevent displacement of any further elements beyond said other element, the blocking elements and control elements furthermore having cooperating faces so arranged that on the movement of one control element and the consequent displacement of at least one blocking element, the displaced and undisplaced blocking elements prevent movement of any other control element, said coin block release member being constituted by a pivoted lever against which one element of said series of blocking elements engages to rotate the lever, which lever, when a coin is present in said coin slot, displaces the coin to release said coin block on displacement of part of said series of blocking elements, said coin block release member having a control surface arranged to block movement of said coin return key when the coin block release member is operated and to block operation of the coin block release member during the operation of the coin return key.

8. In a coin-released automatic vending machine having a series of goods compartments arranged in two rows or columns, the combination of, for each row or column, a series of blocking elements displaceable linearly to push one against another, a closure member for each compartment for preventing access to the compartment, and a control element for each compartment, the control elements each being pivotally mounted to constitute a lever and being operatively coupled to the associated closure member to be tilted on operation of the closure member to open a compartment, each control element having a portion engaging one of two adjacent blocking elements which portion on operating a closure member to open a compartment initially moves substantially in the direction of the line of blocking elements to displace said one blocking element and hence any further elements beyond said one element, and each of said control elements having a portion, on initial movement of the closure member, engaging the other of said two adjacent blocking elements to prevent displacement of said other element and hence to prevent displacement of any further elements beyond said other element, the blocking elements and control elements furthermore having cooperating faces so arranged that on the movement of one control element and the consequent displacement of at least one blocking element, the displaced and undisplaced blocking elements prevent movement of any other control element, all the blocking elements being arranged between the two rows or columns with the two sets of blocking elements being displaceable in opposite directions and means operatively coupling the two sets to one another so that they are effective, on operation of any one closure member, to prevent operation of any other closure member.

9. In a coin-released automatic vending machine having a series of goods compartments arranged in two similar adjacent rows or columns, the combination of a single series of blocking elements displaceable linearly to push one against another, a closure member for each compartment for preventing access to the compartment, a control element for each compartment, the control elements each being pivotally mounted to constitute a lever and being operatively coupled to the associated closure member to be tilted on operation of the closure member to open a compartment, each control element having a portion engaging one of two adjacent blocking elements, the blocking elements being arranged to cooperate with the control elements of the two rows or columns of compartment, which portion of said control element on operating a closure member to open a compartment initially moves substantially in the direction of the line of blocking elements to displace said one blocking element and hence any further elements beyond said one element, and each of said control elements having a portion, on initial movement of the closure member, engaging the other of said two adjacent blocking elements to prevent displacement of said other element and hence to prevent displacement of any further elements beyond said other element, the blocking elements and control elements having cooperating faces so arranged that on movement of one control element and the consequent displacement of at least one blocking element, the displaced and undisplaced blocking elements prevent movement of any other control element whereby all the compartments of both rows or columns are locked with the exception of the compartment in the other row or column adjacent the one being opened, and locking means operated by each closure member on opening a compartment to lock the adjacent compartment in the other row or column.

10. The combination as claimed in claim 9 wherein said locking means for locking the adjacent compartment comprise levers associated with and operated by the various closure members and at least one intermediate member cooperating with the levers of adjacent compartments to permit only one closure member of a pair of adjacent compartments to be opened.

11. The combination as claimed in claim 10 wherein for each pair of adjacent compartments there is provided a forked member with two limbs and wherein the two levers of a pair of adjacent compartments cooperate with the two limbs of the forked member, the levers having oblique surfaces and the levers being movable together and arranged so that, when one lever is moved by its associated closure member, this lever and the first limb are relatively displaced to a position in which the other lever is prevented from moving by the second limb.

12. The combination as claimed in claim 10 wherein for each pair of adjacent compartments there is provided a forked member with two limbs and wherein the two levers of a pair of adjacent compartments cooperate with the two limbs of the forked member, the limbs having oblique surfaces and the limbs being movable together and arranged so that, when one lever is moved by its associated closure member, this lever and the first limb are relatively displaced to a position in which the other lever is prevented from moving by the second limb.

13. In a coin-released automatic vending machine having two horizontal rows of goods compartments one above the other which contain goods of different values, the combination of a single series of blocking elements displaceable linearly to push one against another, a closure member for each compartment for preventing access to the compartment, a control element for each compartment, the control elements each being pivotally mounted to constitute a lever and being operatively coupled to the associated closure member to be tilted on operation of the closure member to open a compartment, each control element having a portion engaging one of two adjacent blocking elements, the blocking elements being arranged to cooperate with the control elements of the two rows of compartments, which portion of said control element on operating a closure member to open a compartment initially moves substantially in the direction of the line of blocking elements to displace said one blocking element and hence any further elements beyond said one element, and each of said control elements having a portion, on initial movement of the closure member, engaging the other of said two adjacent blocking elements to prevent displacement of said other element and hence to prevent displacement of any further elements beyond said other element, the blocking elements and control elements having cooperating faces so arranged that on movement of one control element and the consequent displacement of at least one blocking element, the displaced and undisplaced blocking elements prevent movement of any other control element whereby all the compartments of both rows are locked with the exception of the compartment in the other row adjacent the one being opened, locking means operated by each closure member on opening a compartment to lock the adjacent compartment in the other row, a single coin releasing device for the two rows, which coin releasing device has two coin channels for coins of different values, coin slots in said two channels, a common feeler with at least one coin feeling pin for the two slots and a catch-surface on said feeler for retaining lower value coins in one of said channels, said feeler being arranged, when an attempt is made to open a compartment containing higher value goods on insertion of a lower value coin, to tilt and remove said catch-surface from the path of the coin, whereby the coin is returned.

14. In a coin-released automatic vending machine having several rows of goods compartments, the combination, for each row, of a series of blocking elements displaceable linearly to push one against another, a closure member for each compartment for preventing access to the compartment, and a control element for each compartment, the control elements each being pivotally mounted to constitute a lever and being operatively coupled to the associated closure member to be tilted on operation of the closure member to open a compartment, each control element having a portion engaging one of two adjacent blocking elements which portion on operating a closure member to open a compartment initially moves substantially in the direction of the line of blocking elements to displace said one blocking element and hence any further elements beyond said one element, and each of said control elements having a portion, on initial movement of the closure member, engaging the other of said two adjacent blocking elements to prevent displacement of said other element and hence to prevent displacement of any further elements beyond said other element, the blocking elements and control elements furthermore having co-operating faces so arranged that on the movement of one control element and the consequent displacement of at least one blocking element, the displaced and undisplaced blocking elements prevent movement of any other control element; a further set of blocking elements, one for each row of goods compartments and means actuated by the displacement of part of any one of said series of blocking elements to actuate said further sets of blocking elements to block the displacement of blocking elements in any other series.

15. In a coin-released automatic vending machine having a series of goods compartments arranged in a row or column, the combination of a series of blocking elements displaceable linearly to push one against another, a closure member for each compartment for preventing access to the compartment, a control element for each compartment, a coin release mechanism including a coin support slot and a coin receiver chute, the control elements each being pivotally mounted to constitute a lever and being operatively coupled to the associated closure member to be tilted on operation of the closure member to open a compartment, each control element having a portion engaging one of two adjacent blocking elements which portion on operating a closure member to open a compartment initially moves substantially in the direction of the line of blocking elements to displace said one blocking element and hence any further elements beyond said one element, and each of said control elements having a portion, on initial movement of the closure member, engaging the other of said two adjacent blocking elements to prevent displacement of said other blocking element and hence to prevent displacement of any further elements beyond said other element, the blocking elements and control elements furthermore having co-operating faces so arranged that on the movement of one control element and the consequent displacement of at least one blocking element, the displaced and undisplaced blocking elements prevent movement of any other control element, a two-armed lever arranged in the path of the last blocking element of the row to be swung thereby in one direction, spring means acting on said two-armed lever to tend to swing in the opposite direction, a two-armed latch pivotally carried on one arm of said two-armed lever, a fixed stop positioned to engage said latch when the two-armed lever is swung and thereby to effect relative turning of the latch with respect to the lever, a coin-feeler pin carried on the other arm of said two-armed lever, a further stop on the last blocking element of the row at the end of the row at which the element is always displaced on operating any closure member, said coin-feeler pin being located opposite said further stop when the latch is in the rest position, spring means holding said coin support slot resiliently against the coin feeler pin with a stronger spring force than that exerted by the spring for the lever, a further fixed stop and a feeler-pin operating stop on said last blocking element, said coin support slot being provided with a feeler hole for the feeler pin so that, when the blocking element is displaced and a coin is in the coin slot, the two-armed lever is swung through the coin path until said further fixed stop stops reception of the coin although the blocking element continues moving, the feeler pin being moved away from the coin by said feeler pin operating slot so that the coin can fall into said coin receiver chute.

16. The combination as claimed in claim 15 wherein the stop for the latch and a resiliently flexible coin receiver are formed of a lever pivoted to the blocking element, which lever is double armed and is spring urged in one direction by spring action stronger than that exerted by the spring on the feeler pin lever.

17. The combination as claimed in claim 15 wherein the feeler pin lever is returned to its position of rest by the striking of a stop member against a catch on the feeler pin.

References Cited in the file of this patent

UNITED STATES PATENTS

| | | |
|---|---|---|
| 2,227,663 | Mergens | Jan. 7, 1941 |
| 2,766,906 | Bookout | Oct. 16, 1956 |

FOREIGN PATENTS

| | | |
|---|---|---|
| 74,103 | Sweden | Apr. 19, 1932 |
| 330,276 | Great Britain | May 28, 1930 |
| 366,087 | Great Britain | Jan. 27, 1932 |
| 458,226 | Great Britain | Dec. 15, 1936 |
| 480,303 | Great Britain | Feb. 21, 1938 |
| 603,052 | Germany | Sept. 24, 1934 |